Figure 1:
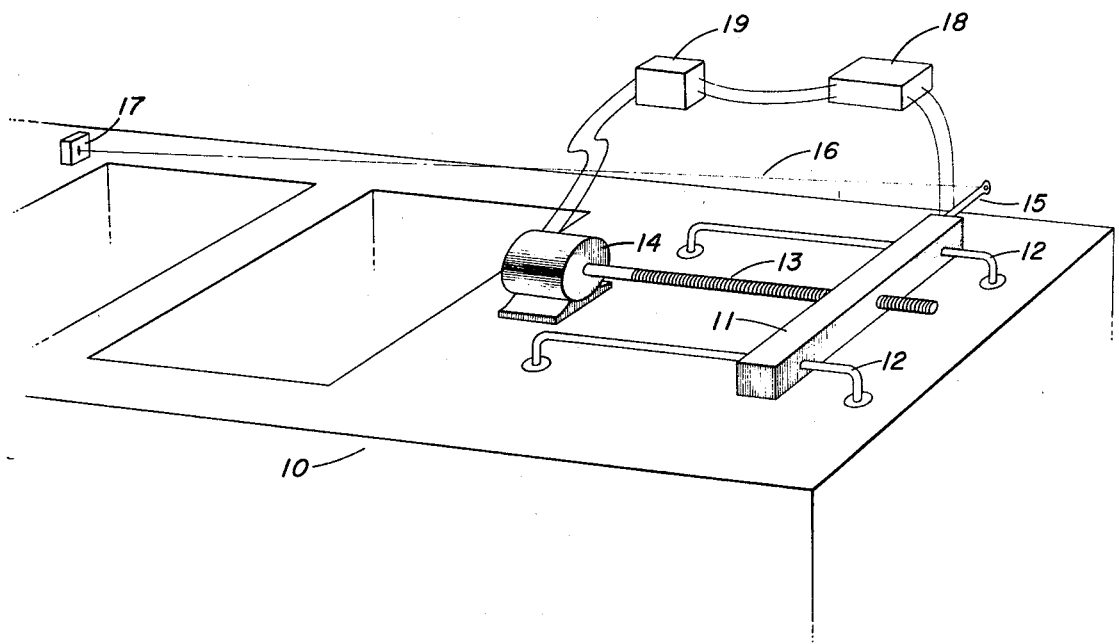

United States Patent

[11] 3,632,213

| [72] | Inventor | Blount C. Trice<br>Ponca City, Okla. |
|---|---|---|
| [21] | Appl. No. | 33,465 |
| [22] | Filed | Apr. 30, 1970 |
| [45] | Patented | Jan. 4, 1972 |
| [73] | Assignee | Continental Oil Company<br>Ponca City, Okla. |

[54] EMISSION SPECTROMETER FOCUS CONTROL
1 Claim, 1 Drawing Fig.

[52] U.S. Cl. .................................................. 356/74, 356/80
[51] Int. Cl. ................................................. G01j 3/00, G01j 3/04
[50] Field of Search .......................................... 356/74, 80; 73/16

[56] References Cited
UNITED STATES PATENTS

| 3,537,796 | 11/1970 | Dudeney ..................... | 356/74 |
| 3,064,520 | 11/1962 | Saunderson et al. .......... | 356/80 |
| 3,106,086 | 10/1963 | Hughel ....................... | 73/16 |

*Primary Examiner*—Ronald L. Wibert
*Assistant Examiner*—V. P. McGraw
*Attorneys*—Joseph C. Kotarski, Henry H. Huth, Robert B. Coleman, Jr., William A. Mikesell, Jr. and Carroll, Palmer, Kemon, Palmer, Stewart and Estabrook

ABSTRACT: Malfocus of an emission spectrometer caused by changes in length of the instrument chassis due to ambient temperature changes is corrected by adjusting the optical system responsive to strain gauge measurement of the length changes.

INVENTOR.
BLOUNT C. TRICE

EMISSION SPECTROMETER FOCUS CONTROL

This invention relates to maintaining the focus of an emission spectrometer. In one aspect, the invention relates to adjustment of the optics of an emission spectrometer responsive to strain gauge measurement in order to correct malfocus occasioned by length changes of the instrument chassis.

It is well recognized in the art that focus is quite crucial in emission spectrometry, and that the depth of field is typically quite shallow, of the order of a few millimeters. Because the focusing procedure is time consuming, it would be desirable to maintain focus in spite of the inevitable ambient temperature changes which in turn cause changes in the length of the instrument chassis, and consequently of the length of the optical path.

This problem is recognized in the prior art, and automatic focusing devices have been presented which, although satisfactory in operation, are complex and expensive. Some automatic focusing devices are shown in U.S. Pat. No. 2,837,959, No. 3,056,330 and No. 3,064,520.

It is accordingly an object of the present invention to provide automatic compensation in the optical system of an emission spectrometer, to compensate for length changes of the optical system, by a relatively simple and low-cost device.

Other aspects, objects, and the several advantages of the invention will become apparent upon study of this disclosure, the appended claims, and the drawing, in which:

The sole FIGURE is a schematic representation of a device suitable for carrying out the present invention.

Referring now to the drawing, there is shown a typical elongated chassis 10 upon which are arranged the components (not shown) of the optical system of an emission spectrometer; such components comprise the arc source, the slit, the mirror, the grating, and the camera, all as well known in the art. Such instruments are generally arranged with the mirror and the slit mounted near opposite ends of chassis 10. According to the present invention, one of the optical components which is mounted near an end of the chassis, for example the slit, is instead mounted on a longitudinally movable support 11, which in turn is supported by a pair of guides 12. Support 11 is moved longitudinally of chassis 10 on guides 12 by, e.g., a fine-thread worm screw 13 driven by a reversible motor 14. A strain gauge 15 is suitably secured to support 11, and the flexure plate or actuating element of the gauge is mechanically connected by a rod 16 to an object 17 located near the other end of chassis 10 from support 11. Object 17 can comprise, for example, a simple anchor or can alternatively comprise another of the optical components, such as the mirror. Rod 16 is preferably of a material having a very low coefficient of thermal expansion, such as Pyrex glass.

The output of strain gauge 15, comprising an electrical voltage, is amplified by an amplifier 18 and passed to a Wheatstone bridge 19. The output of bridge 19 is connected to reversible motor 14. Thus, motor 14, strain gauge 15, bridge 19, and amplifier 18 together constitute a nulling device, as is known in the art. As a change in ambient temperature occurs, chassis 10 is shortened or lengthened, depending upon the direction of the temperature change. This change of chassis length tends to defocus the optical system of the spectrometer. However, the change of chassis length also changes the amount of strain on gauge 15 and, depending upon the direction of strain and thus the direction of change of output from stain gauge 15, motor 14 will be actuated to rotate in one direction or the other to return support 11 to its original distance from object 17 by the nulling action of bridge 19.

The effect of temperature on the resistance of gauge 15 can be compensated for by positioning a dummy strain gauge adjacent gauge 15; the dummy gauge is not subjected to any strain, but is subjected to the same ambient temperature as is gauge 15. Thus, when it is placed in a leg of the Wheatstone bridge adjacent gauge 15, temperature effects are cancelled out.

The strain gauge has thus far been considered as the sole means of detecting relative displacement by, e.g., temperature of the optical components. Another suitable displacement detector comprises a differential transformer. Such a device, in its simplest form, consists of a hollow nonconducting form tube with a primary transformer winding around its outside center and a pair of identical secondary windings, connected in opposing series, one on each side of the primary winding. A movable iron core within the tube effects magnetic coupling of the windings. When the primary of such a device is excited with alternating current, the net output of the secondary windings will be null if the core is symmetrically located within the tube with respect to the windings. Any shift of the core within the tube will cause one secondary winding to become better coupled with respect to the primary, and the other secondary to lose coupling with respect to the primary, resulting in an output in the secondary. The amplitude of this output is virtually linear with respect to distance of core movement over a considerable range on either side of null, and the phase of the output signal indicates which direction the displacement is from null. Thus, if such a transformer is attached, e.g., to support 11 in lieu of strain gauge 15, and the core of the transformer connected to rod 16, the output of the differential transformer in conjunction with reversible motor 14 becomes a null device. Phase of the secondary output can be detected by attaching a diode bridge rectifier across each secondary such that their outputs are phased by a common connection between the negative output of one and the positive output of the other; the remaining negative and positive terminals are the single output of the transformer, which in turn is used to indicate direction and amount of rotation required by motor 14 to restore the system to null, i.e., to compensate the optical system focus for changes in the chassis length.

It will be understood that various changes in the details, materials, steps, and arrangement of parts, which have been herein described and illustrated in order to explain the nature of the invention, may be made by those skilled in the art within the principle and scope of the invention.

What is claimed is:

1. Emission spectrometer apparatus comprising:
   a. an elongated instrument chassis;
   b. support means near one end of said chassis movable in a direction longitudinal of said chassis;
   c. means for moving said support means;
   d. means for detecting changes in length of said chassis, said means for detecting comprising strain gauge means or differential transformer means connected between said support means and a point fixed near the other end of said chassis;
   e. an optical element of said emission spectrometer mounted on said support means; and
   f. means responsive to said means for detecting for actuating said means for moving in a direction opposite that detected by said means for detecting.

* * * * *